Aug. 30, 1960 S. OLDBERG 2,950,736
VALVE MECHANISM WITH INTEGRAL SPRING AND CAGE MEMBER
Filed Nov. 23, 1956

*INVENTOR.*
SIDNEY OLDBERG

BY

*ATTORNEYS*

United States Patent Office 2,950,736
Patented Aug. 30, 1960

2,950,736

VALVE MECHANISM WITH INTEGRAL SPRING AND CAGE MEMBER

Sidney Oldberg, Birmingham, Mich., assignor to Eaton Manufacturing Company, Cleveland, Ohio, a corporation of Ohio Filed Nov. 23, 1956, Ser. No. 624,133

10 Claims. (Cl. 137—529)

This invention relates to valve mechanisms and particularly to a combination cage and spring retaining means for maintaining a valve member relative to a valve seat. The practical embodiments of this invention lie in the manufacturing simplicity of the design and in the economy of its production.

An object of this invention is to provide an improved cage-spring means for relating a movable valve member with a valve seat.

Also an object of this invention is to provide an improved valve retaining cage-spring means as above described, having low stress characteristics.

Another object of this invention is to provide a valve retaining member comprised of a metal sheet forming a cage member, with a spring or resilient member being formed from the sheet metal cage itself.

A further object is to provide an improved valve mechanism in which the valve spring, defined by a partially sheared portion of a cage-spring member, is in the form of leaf spring means comprising dual finger members angularly disposed from the cage base with the apex of their angles originating in the base of the cage. In the forming of the fingers, the excess metal is stamped from the base portion forming an opening for allowing fluid passage through the cage member.

Still another object is to provide in a valve mechanism of the character above referred to, a cage-spring mechanism including a pair of oppositely disposed fingers, the free ends of which lie in a common plane in spaced relation to one another and being adapted to engage the valve means for holding same upon a valve seat.

This invention can be further briefly summarized as containing novel and practical combinations and arrangements of parts hereinafter described and particularly set out in the claims hereof.

Other objects and advantages of the invention will appear from the following description taken in connection with the drawings forming a part of the specification; and in which.

Figure 2:
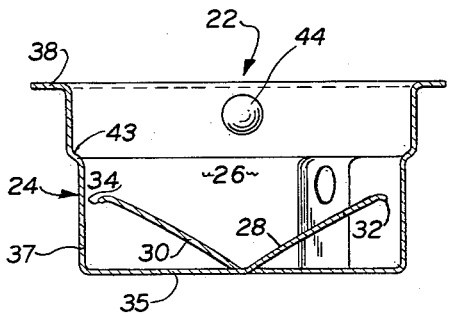
Figure 2 is an enlarged sectional view of the combination cage and valve spring in its unassembled state.
Figure 1:
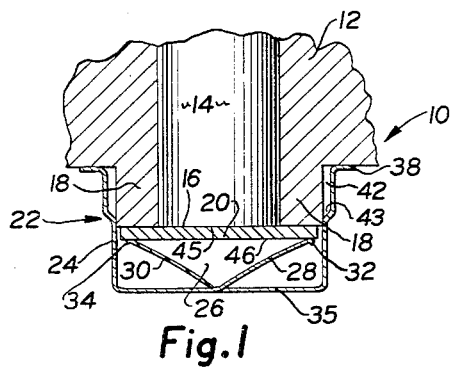
Figure 1 is a vertical cross-sectional view of the valve mechanism consisting of a body member, a valve and combination cage and valve spring.

Referring to the drawings for more specific details of the invention, the valve mechanism 10, as shown, comprises in general a body member 12, having a passage 14 therethrough and an end portion 18 thereof forming a valve seat adjacent an open end 16 thereof, and a valve member 20, in the form of a flat disk, adapted to be seated on the valve seat for controlling fluid flow through passage 14.

Disposed directly beneath the valve body is a combination cage and valve spring member 22. This combination member comprises a hollow cage member 24 formed from sheet metal adapted to enclose a chamber 26 disposed between the member 12 and said cage 24. Dual fingers 28 and 30 are formed from the member 22 integral with the cage so as to provide free ends 32 and 34 adapted to engage the valve member and hold it with a spring load upon the valve seat 18.

Figure 3:
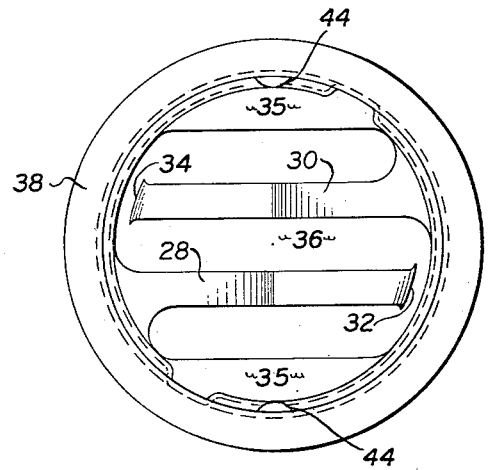
Figure 3 is a top view of the combination cage and valve spring.
Figure 4:
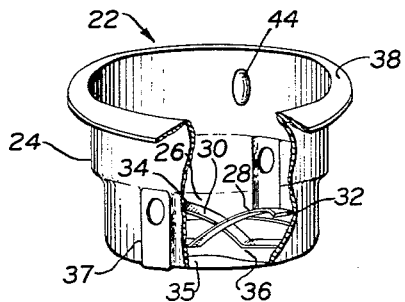
Figure 4 is an isometric view of the combination cage and valve spring.

The combination cage and valve spring member shown in its detached relation, Figures 2 and 3, can be further described as being formed from a sheet metal operation producing the cage 24 and the dual fingers 28 and 30. Excess metal stamped from the cage base 35 leaves the two strips forming the dual fingers 28 and 30 and provides for an opening 36, allowing fluid passage from the body member through the cage base portion.

The dual fingers formed from the strips are in opposite angularly extended relation to one another with ends 32 and 34 being formed at the extremities thereof. The stamping of the metal strips is done in such a manner as to provide the ends of the fingers spaced from one another and lying in a common plane spaced from and parallel to the base 35 of the cage.

A cylindrical body portion 37 of the cage 24 is formed in such a manner as to provide, as shown in Figure 2, a flange portion 38, located at the extreme end of the body portion remote from the cage base. The flange portion 38 is formed from the cylindrical portion 37 such that in assembly on body member 12 an annular chamber 42 is provided between the body member 12 and an inner concave shaped shoulder portion 43. A plurality of circumferentially spaced indentations or depressions 44 are formed from the upper annular portion of cylindrical shell 37 intermediate the angular shoulder portion 43 and flange 38. The lower annular portion of cylindrical shell 37 below the shoulder 43 is disposed radially adjacent the lateral surface of end portion 18 to laterally confine cage member 22. The provision of shoulder 43 also strengthens the cage.

Indentations 44 function to frictionally contact the lateral surface of end portion 18 so that cage member 22 is frictionally held in assembled relationship with member 12. Provision of the indentations allow for greater dimensional tolerance in cage member 22 and insures positive frictional contact at a predetermined number of points.

The valve member 20 is formed as a disc shaped solid having flat parallel faces 45 and 46 axially spaced from one another. The lower face 46 is in intimate contact with the free end portions of the finger members and the upper face 45 is held in resilient contact by the finger ends with the valve seat 18 formed by the body 12.

The finger end portions forming the contact points have their extreme ends curved in a downward direction, being concave with respect to the base portion. Dependent upon the load exerted by the valve member 20, the fingers being so arrayed in an angular fashion as to change the relative contact points at the finger ends with the change of the angular displacement of the fingers. Therefore, at varying loads on the valve, the angular positioning of the said end portions compensates for the relative angular displacement of the fingers obtaining continuous steady contact between the two members.

The structural configuration of the finger end portions described above, is adapted to point contact relationship with the valve member tending to eliminate the excess frictional resistance otherwise obtained from a surface or planar contact area. The sliding action of a planar surface increases the wear to the finger end portions with a binding result to the movement of the valve member. These stated hindrances are eliminated by the above disclosed structure and accordingly, this structure lengthens the life of the resilient means.

From the foregoing description and the accompanying drawings, it can be readily seen that this invention provides a valve mechanism which is of a very simple and practical construction and in which the valve retaining member is a one piece sheet metal member comprising both a valve cage and a valve spring. Additionally, it will be seen that a retaining member of this form can be readily produced from sheet metal of desired characteristics such that the leaf springs formed by the partially sheared portion of the retaining member will have a long spring life and will have a desired low rate capacity for a proper actuation of the movable valve member of the mechanism. Furthermore, it will be seen that by reason of the stamped sheet metal cup-like form of the combined cage and spring this member can be rapidly and economically produced and can be quickly and easily assembled into its proper position in the mechanism.

While this invention has been described in connection with a certain specific embodiment, the mechanism involved is susceptible of numerous other applications that will readily occur to men skilled in the art. Therefore, the invention is limited only as indicated by the scope of the appended claims.

What I claim is:

1. In a valve mechanism, a body member having a passage therein, a valve seat formed in the body adjacent an opening of said passage, a valve member, and a one piece combination cage and spring means associated with said body member and valve member with the valve member disposed between the combination means and the body member, said combination means including a pair of spring fingers formed as a part thereof and extending in opposite direction to one another inwardly of the member into engagement with the valve member effective to resiliently hold the valve member on the seat formed in the body.

2. In a valve mechanism, a body member having a passage therein, a valve seat formed in the body adjacent an opening of said passage, a valve member, and a combination cage and spring means associated with said body body member, said combination means including a cage having a base portion and a pair of angularly disposed finger members formed from said base portion and extending inwardly and in opposite direction to one another with the apex of their angles formed at the junctions of the fingers and base portion of said cage means, the free ends of said fingers resiliently engaging the valve member, said cage further comprising an upper lateral wall portion and a lower lateral wall portion, an annular shoulder portion connecting said upper and lower wall portions, circumferentially spaced, inwardly projecting indentations formed in said upper lateral wall portion, and said indentations being disposed in frictional contact with said body member to thereby maintain said body member and said cage in assembled relationship.

3. In a valve mechanism, a body member having a passage therein, a valve seat formed in the body adjacent an opening of said passage, a valve member, and a one piece combination cage and spring means associated with said body member, said combination means comprising base and wall portions and including a pair of angularly disposed finger members formed from said base portion and extending from said wall portion inwardly and in opposite directions to one another, said finger members having their free ends lying in the same plane, with said plane being axially spaced and parallel to the plane of the base portion, and the free ends of said fingers resiliently engaging the valve member.

4. In a valve mechanism, a body member having a passage therein, a valve seat formed in the body adjacent an opening of said passage, a valve member, and a one piece combination cage and spring means associated with said body member, said combination cage and spring means including a plurality of angularly disposed resilient finger members formed as a part thereof, said fingers being inwardly disposed from a base portion of said combination means and having their free end portions lying in a plane parallel to the plane of the base portion and said free end portions being disposed axially between the base portion and said valve member.

5. In a valve mechanism, a body member having a passage therein, a valve seat formed in the body adjacent an opening of said passage, a valve member, and a combination cage and spring means associated with said body member, said combination means comprising a lower wall portion, an upper wall portion of a larger diameter than said lower wall portion, a flanged end formed from the upper wall portion engageable with the body member, a base portion disposed on the end of the lower wall portion opposite said flanged end and a pair of finger members integrally formed as a part thereof, said fingers angularly disposed from said base portion and extending inwardly and in opposite direction to one another toward said valve member, said fingers having their end portions intimately engaging said valve member, holding same in resilient contact with the valve seat, said valve seat extending inwardly toward said base portion and opening into a fluid chamber formed by the lower wall portion and base portion of said combination means, said body member having a shoulder portion axially spaced from said valve seat for engageably receiving the flanged end of the combination means, and inwardly projecting indentations formed in said upper wall portion in frictional contact with said body member whereby said combination means is held in assembly with said body member.

6. In a valve mechanism, a body member having a passage therein, a valve seat formed in the body adjacent an opening of said passage, a valve member adapted to seat on said valve seat and close the opening adjacent said seat, and a one piece combination cage and spring means secured to said body member with said valve member disposed within said cage and spring means, said cage and spring means including a base member, a plurality of angularly disposed resilient finger members formed from said base member and extending inwardly and axially from a point spaced from the valve seat toward the valve seat and having their free end portions in resilient load-engaging relation with the valve member to hold the valve member upon the valve seat.

7. In a valve mechanism, according to claim 6, wherein said combination cage and spring means includes a sleeve portion with one end secured to said body member and with said resilient finger members extending from said sleeve portion at its opposite end and extending axially inwardly of the sleeve toward the valve seat.

8. In a valve mechanism according to claim 7, wherein the contact points of the finger free end portions lie in a common plane and wherein said points have linear engagement with the valve member.

9. In a valve mechanism according to claim 8, wherein the finger members are two in number and extend in opposite directions in relation to each other with the opposite ends of the finger members from the free extremities thereof being formed from the one end of the sleeve portion.

10. A one piece combination cage and spring means including a sleeve portion having a base portion, a pair of resilient finger members formed from said base portion and extending in opposite directions in overlapping relation to each other with the opposite ends of the finger members from the free extremities thereof being formed from the base portion of the sleeve portion.

(References on following page)

References Cited in the file of this patent

UNITED STATES PATENTS

| | | |
|---|---|---|
| 588,456 | Mathewson | Aug. 17, 1897 |
| 686,736 | Josse | Nov. 19, 1901 |
| 1,227,759 | Day | May 29, 1917 |
| 1,833,841 | Leinert | Nov. 24, 1931 |
| 2,472,840 | Lewton | June 14, 1949 |
| 2,569,176 | Katcher | Sept. 25, 1951 |

FOREIGN PATENTS

| | | |
|---|---|---|
| 646,092 | France | July 9, 1928 |
| 929,174 | Germany | June 20, 1955 |